United States Patent
Halpert et al.

(10) Patent No.: US 11,231,513 B2
(45) Date of Patent: Jan. 25, 2022

(54) SYSTEMS AND METHODS FOR REFINING ESTIMATED PARAMETER VALUES IN SEISMIC IMAGING

(71) Applicant: CHEVRON U.S.A. INC., San Ramon, CA (US)

(72) Inventors: Adam Dean Halpert, Houston, TX (US); Laura L. Bandura, Houston, TX (US); Shuxing Cheng, Houston, TX (US); Konstantin Osypov, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 662 days.

(21) Appl. No.: 15/833,203

(22) Filed: Dec. 6, 2017

(65) Prior Publication Data

US 2019/0170888 A1 Jun. 6, 2019

(51) Int. Cl.
| | | |
|---|---|---|
| *G01V 1/28* | (2006.01) | |
| *G01V 1/34* | (2006.01) | |
| *G01V 1/36* | (2006.01) | |
| *G01V 1/30* | (2006.01) | |

(52) U.S. Cl.
CPC .............. *G01V 1/282* (2013.01); *G01V 1/306* (2013.01); *G01V 1/345* (2013.01); *G01V 1/362* (2013.01); *G01V 2210/3246* (2013.01); *G01V 2210/512* (2013.01)

(58) Field of Classification Search
CPC ........ G01V 1/282; G01V 1/306; G01V 1/345; G01V 1/362; G01V 2210/3246; G01V 2210/512
See application file for complete search history.

(56) References Cited

U.S. PATENT DOCUMENTS

| | | | | |
|---|---|---|---|---|
| 9,310,500 B2 * | 4/2016 | Kacewicz | ............. | G01V 1/303 |
| 2015/0316673 A1 * | 11/2015 | Wiener | .................... | G01V 1/32 |
| | | | | 702/14 |

OTHER PUBLICATIONS

Chao Dong; Chen Change Loy; Kaiming He; Xiaoou Tang; "Image Super-Resolution Using Deep Convolutional Networks"; Jul. 31, 2015 (Year: 2015).*

Chen, K. et al., ABC-CNN: An Attention Based Convolutional Neural Network for Visual Question Answering, Apr. 3, 2016, University of Southern California, https://arxiv.org/pdf/1511.05960.pdf.

(Continued)

*Primary Examiner* — Roy Y Yi
*Assistant Examiner* — Geoffrey T Evans
(74) *Attorney, Agent, or Firm* — Sheppard, Mullin, Richter & Hampton LLP (57) ABSTRACT

Systems and methods for training a model that refines estimated parameter values include computer processors and non-transitory electronic storage that stores subsurface map data sets that correspond to different subsurface volumes of interest, the system configured to obtain training data including unrefined subsurface map data sets specifying estimated parameter values of a first parameter as a function of position within corresponding subsurface volumes of interest, obtain an initial seismic mapping model, generate a conditioned seismic mapping model, and store the conditioned seismic mapping model in the electronic storage.

20 Claims, 7 Drawing Sheets

(56) References Cited

OTHER PUBLICATIONS

Kang, L. et al., Convolutional Neural Networks for No-Reference Image Quality Assessment, 2014, University of Maryland, http://www.cv-foundation.org/openaccess/content_cvpr_2014/papers/Kang_Convolutional_Neural_Networks_2014_CVPR_paper.pdf.

Johnson, J. et al., Perceptual Losses for Real-Time Style Transfer and Super-Resolution, Mar. 27, 2016, Stanford University, https://arxiv.org/pdf/1603.08155.pdf.

Gatys, L. et al., Image Style Transfer Using Convolutional Neural Networks, 2016, University of Tubingen, Germany, http://www.cv-foundation.org/openaccess/content_cvpr_2016/papers/Gatys_Image_Style_Transfer_CVPR_2016_paper.pdf.

Kim, J. et al., Deeply-Recursive Convolutional Network for Image Super-Resolution, 2016, Seoul National University, Korea, http://www.cv-foundation.org/openaccess/content_cvpr_2016/papers/Kim_Deeply-Recursive_Convolution_Network_CVPR_2016_paper.pdf.

Shen, W. et al., Multi-scale Convolutional Neural Networks for Lung Nodule Classification, Chinese Academy of Sciences, Beijing, China, http://or.nsfc.gov.cn/bitstream/00001903-5/416411/1/1000014049557.pdf.

Dosovitskiy, A. et al., FlowNet: Learning Optical Flow with Convolutional Networks, 2015, University of Freiburg, http://www.cv-foundation.org/openaccess/content_iccv_2015/papers/Dosovitskiy_FlowNet_Learning_Optical_ICCV_2015_paper.pdf.

Freeman, W.T. et al., Learning Low-Level Vision, Dec. 2000, http://www.cs.virgzinia.edu/~gfx/Courses/2006/DataDriven/bib/texsyn/freeman00.pdf.

Glasner, D. et al., Super-Resolution from a Single Image, 2010, The Weizmann Institute of Science, Israel, http://www.weizmann.ac.il/mathusers/vision/courses/2010_2/papers/single_image_SR.pdf.

He, S. et al., SuperCNN: A Superpixelwise Convolutional Neural Network for Salient Object Detection, Apr. 8, 2015, Springer Science + Business Media, http://www.shengfenghe.com/uploads/1/5/1/3/15132160/supercnn_ijcv2015.pdf.

Huang, Y. et al., Bidirectional Recurrent Convolutional Networks for Multi-Frame Super-Resolution, Center for Research on Intelligent Perception and Computing National Laboratory of Pattern Recognition, http://papers.nips.cc/paper/5778-bidirectional-recurrent-convolutional-networks-for-multi-frame-super-resolution.pdf.

Irani, M. et al., Improving Resolution by Image Registration, May 25, 1990, The Hebrew University of Jerusalem, pp. 231-239, 1991, http://www.cse.huji.ac.il/course/2003/impr/supres-cygip-gm91.pdf.

Zeyde, R. et al., On Single Image Scale-Up using Sparse-Representations, 2012, Curves and Surfaces, pp. 711-730, Israel Institute of Technology, http://www.cs.technion.ac.il/~matanpr/ImageScaleUP_LNCS.pdf.

Timofte, R. et al., Anchored Neighborhood Regression for Fast Example-Based Super-Resolution, Computer Vision Foundation, 2013, IEEE International Conference on Computer Vision, pp. 1920-1927, https://pdfs.semanticscholar.org/6b7c/baa346b8f99b2d6679f24056aec0e6cca4e0.pdf.

* cited by examiner

SYSTEMS AND METHODS FOR REFINING ESTIMATED PARAMETER VALUES IN SEISMIC IMAGING

FIELD OF THE DISCLOSURE

The present disclosure relates generally to seismic data analysis and enhancement and more particularly to improving seismic image sensitivity by refining estimated parameter values in subsurface map data sets.

BACKGROUND

Current seismic images are often filled with distortions that prevent easier identification of hydrocarbon deposits. Analyzing subsurface map data to determine parameter values often requires reliance on semblance-based techniques. These techniques may consider variables such as intensity and/or continuity. Determining subsurface parameter values at a scale necessary for drilling decisions is challenging because the sampling density of subsurface map data is limited by both physical and budgetary constraints. Furthermore, the subsurface map data are often contaminated by noise; existing semblance-based techniques to distinguish signal from noise fail to adequately account for various issues associated with subsurface map data, such as types of coherent noise. Quantitative estimates of signal-to-noise ratios also become more difficult because reference points are unavailable to compare against the subsurface map data.

SUMMARY

One or more implementations of the systems and methods described herein may train a model that refines estimated parameter values. Techniques that estimate parameter values may suffer from issues associated with data collection and analysis. These issues may correspond to removing noise, increasing sampling density, or determining a signal-to-noise ratio. It is desirable to utilize machine learning to refine estimated parameter values. One or more implementations of the methods presented herein may be configured to solve this problem and/or other problems. By way of non-limiting illustration, sets of components may be arranged to train a model to refine estimated parameter values in subsurface map data sets.

In some implementations, a method for training a model that refines estimated parameter values within subsurface map data sets may be implemented in a computer system that includes one or more physical computer processors and non-transitory electronic storage that stores subsurface map data sets that correspond to different subsurface volumes of interest. For example, a subsurface map data set may correspond to a subsurface volume of interest and specify estimated parameter values of various parameters as a function of position within the given subsurface volume of interest. In some implementations, the method may include obtaining, from the electronic storage, training data. For example, the training data may include (i) unrefined subsurface map data sets that may specify estimated parameter values of a first parameter as a function of position within corresponding subsurface volumes of interest and (ii) refined subsurface map data sets that may specify refined estimations of parameter values of the first parameter as a function of position within the corresponding subsurface volumes of interest. The method may include obtaining, from the electronic storage, an initial seismic mapping model. The method may include generating a conditioned seismic mapping model by training, on the one or more physical computer processors using the training data, the initial seismic mapping model. The method may include storing the conditioned seismic mapping model in the electronic storage. The method may include obtaining an initial target subsurface map data set. The method may include applying the conditioned seismic mapping model to the initial target subsurface map data set to generate a refined target subsurface map data set. The method may include generating an image that represents the refined target subsurface map data set. The method may include displaying the image. In some implementations, the method may include denoised parameter values in the refined target subsurface map data set with respect to parameter values in the initial target subsurface map data set.

In some implementations, the method may include a higher sampling density of parameter values for the refined target subsurface map data set than the sampling density for the initial target subsurface map data set. In some implementations, the method may include obtaining multiple initial target subsurface map data sets that have been derived from different seismic pre-stack data sets. In some implementations, the method may include applying the conditioned seismic mapping model individually to the initial target subsurface map data sets to generate metric values of an estimated quality metric. In some implementations, the method may include selecting from among the multiple sets of seismic pre-stack data based on the metric values of the estimated quality metric determined for the initial target subsurface map data sets.

In some implementations, the method may include generating a stacked seismic image using selected one of the seismic pre-stack data sets. In some implementations, the method may include displaying the stacked seismic image. In some implementations, the estimated quality metric may include an indication of signal-to-noise ratio quality.

These and other objects, features, and characteristics of the present disclosure, as well as the methods of operation and functions of the related components of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of any limits. As used in the specification and in the claims, the singular form of "a", "an", and "the" include plural referents unless the context clearly dictates otherwise.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

DETAILED DESCRIPTION

Systems and methods configured to refine seismic images and data are often constrained by various elements. Seismic images may be gathered using a seismic source to send seismic energy into the subsurface, which may then be reflected and/or refracted by subsurface features and may be recorded at seismic receivers at various distances away from a seismic source. For example, seismic energy may include acoustic compression waves. A seismic imaging tool may generate acoustic compression waves and direct them towards a subsurface region that includes various lithologies (e.g., underground rock structures) for the purpose of identifying hydrocarbon deposits contained within the various lithologies (e.g., crude oil, natural gas, etc.). Seismic images may be generated from seismic signals (e.g., the reflections of the seismic energy off of the various subsurface lithologies) received by seismic sensors, such as geophones or other acoustic detectors. For example, as the seismic energy is directed into the subsurface region, other seismic energy may interact with the seismic energy signal which may add pre-processed noise to the seismic energy signal. Implementations of seismic imaging technology, tend to generate seismic signals that incorporate a substantial level of noise. For example, noise may originate from subsurface shifts, seismic energy reflecting off multiple subsurfaces before being recorded by a seismic receiver, or other sources of interference present in the subsurface lithology.

Figure 6A:
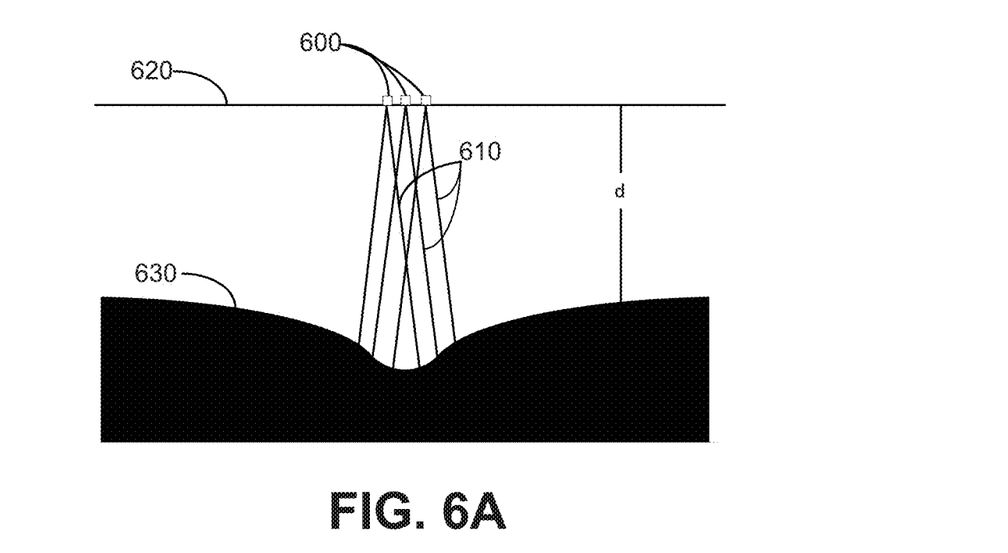
FIG. 6A and FIG. 6B illustrate system layouts for detecting subsurface features.
Figure 6B:
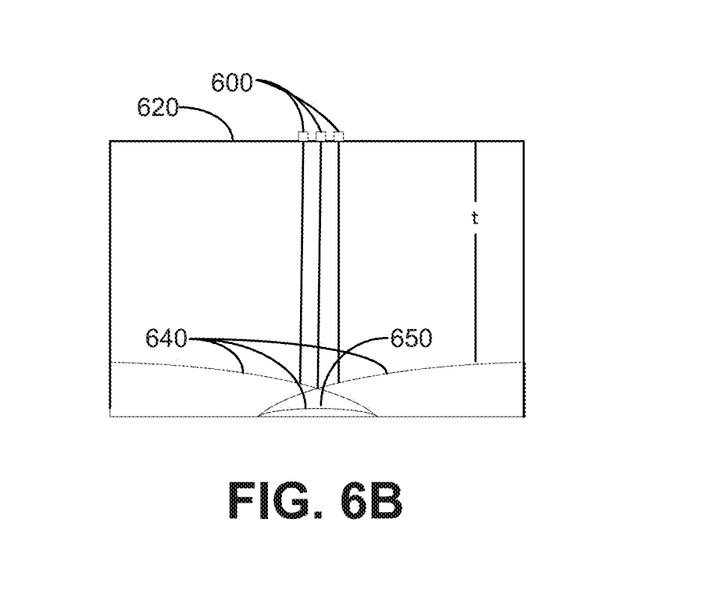

In addition, some noise may be generated from processing seismic images to improve accuracy of the data. For example, some noise may be created as images are migrated. Migration may include relocating seismic data in an image to the appropriate space or time the seismic data actually occurred, as opposed to where it was recorded. FIGS. 6A and 6B may describe why migration is necessary. FIG. 6A illustrates a layout to detect subsurface features. Zero-offset source-receiver pairs 600 may send energy waves 610 into a subsurface region 620. They may reflect off a subsurface feature 630. FIG. 6A illustrates a distance between the subsurface feature 630 and the zero-offset source-receiver pairs 600. When the data is received, it may not accurately reflect the subsurface feature 630. FIG. 6B illustrates how the receivers might receive the data as a function of time. Receivers of the zero-offset source-receiver pairs 600 may plot the data 640, received seismic energy, vertically. However, this results in inaccurate data because the subsurface feature 630 has a circular valley as illustrated in FIG. 6A, not a circular hill as illustrated in FIG. 6B. In order to correct this, the data must be migrated. However, as the data is migrated, the data may leave behind artifacts, which amounts to noise in the seismic image.

Therefore, the seismic image may often be contaminated with different sources of noise, and the images may no longer clearly distinguish between viable subsurface hydrocarbon deposits and noise, especially at a scale necessary for drilling. Improving equipment and signals is in direct competition with lowering costs. Instead, in some implementations of the systems and methods presented herein, a model may be trained to refine estimated subsurface map data. The model may use machine learning to decrease the amount of noise in an image, improve image quality, or indicate a signal-to-noise ratio quality. Once the model is trained using known inputs and outputs, actual data may be applied to the conditioned model. For example, an original image may have noise introduced into the seismic image for training purposes. The seismic data may include added noise. The model may be trained to denoise the image with added noise. In another example, an original image may be filtered to reduce image quality for training purposes.

Figure 1:
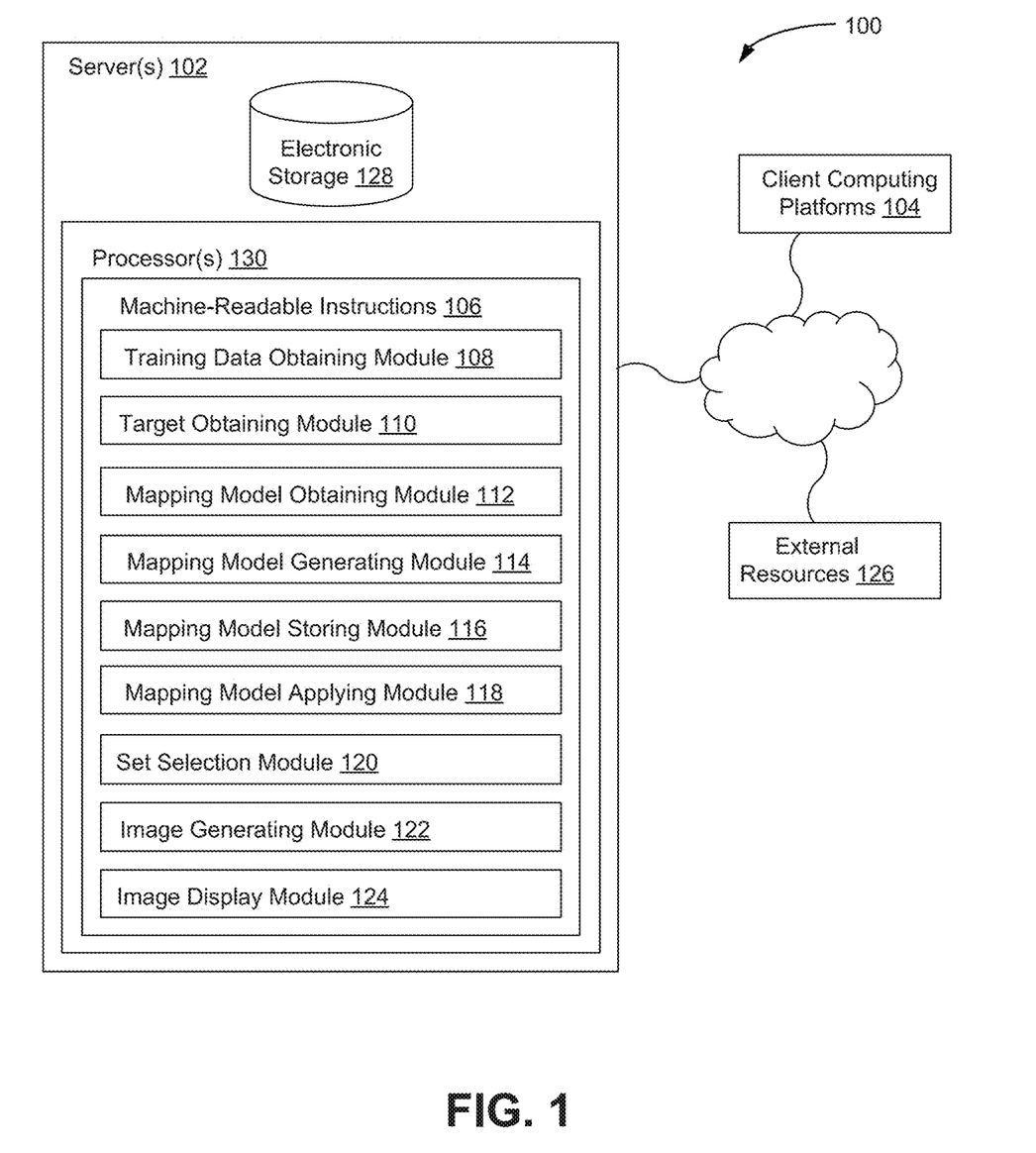
FIG. 1 illustrates a system configured for training a model that refines estimated parameter values within subsurface map data sets, in accordance with one or more implementations.
Figure 7A:
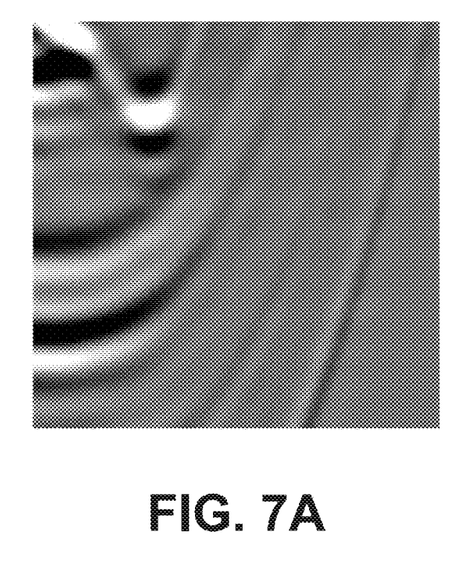
FIG. 7A illustrates an original image that has been filtered to reduce image quality.
Figure 7B:
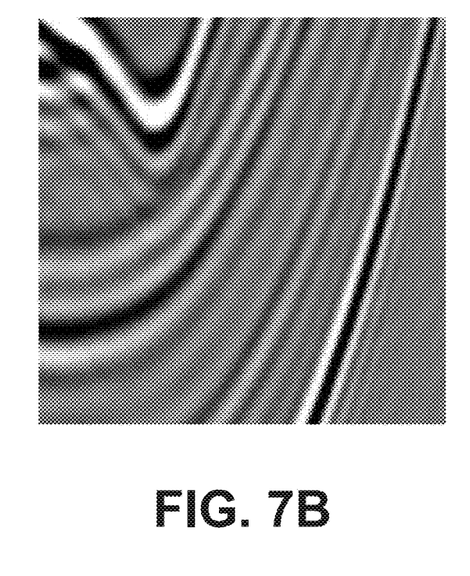
FIG. 7B illustrates a corresponding higher quality original image.

FIG. 7A illustrates an original image that has been filtered to reduce image quality and FIG. 7B illustrates a corresponding higher quality original image. The model may be trained to refine the filtered lower quality image into the higher quality original image. In another example, signal-to-noise ratios may be known for corresponding seismic images. Instead of another image, the model may output a quantitative value. This conditioned model may help improve current seismic images from subsurface volumes of interest, in particular those with hydrocarbon deposits. By improving the seismic images collected, the understanding of the subsurface improves, which saves time and money by optimizing drilling into locations that are more likely to contain hydrocarbon deposits. FIG. 1 illustrates a system 100 configured for training a model that refines estimated parameter values within subsurface map data sets. The system 100 may include one or more physical computer processors and non-transitory electronic storage that stores subsurface map data sets that correspond to different subsurface volumes of interest. A given subsurface map data set corresponding to a given subsurface volume of interest may specify estimated parameter values of different parameters as a function of position within the given subsurface volume of interest, in accordance with one or more implementations. Subsurface map data sets may include subsurface map data. Subsurface map data may include one or more of seismic data, amplitude variation with angle of incidence (AVA) data, amplitude variation with offset, (AVO) data, seismic pre-stack data, seismic images, three-dimensional seismic maps, reservoir models, migrated data, stacked images, parameter values, indications of signal-to-noise ratio quality, and/or other data.

AVA data may include data collected by changing the angle at which a seismic source shoots seismic energy into the subsurface towards one or more receivers. AVO data may include data collected by changing the distance between a seismic source and seismic receiver as the seismic energy is sent into the subsurface. Seismic pre-stack data may include traces. Traces may include a single channel of raw seismic data. Seismic images may include processed seismic data depicting a subsurface region. Reservoir models may include a collection of seismic data from a subsurface volume with one or more hydrocarbon deposits.

Stacked images may include traces that have been added together from different data sets to reduce noise and improve overall data quality. Parameters may include characteristics of a reservoir that may vary with respect to position and/or time. For example, parameters may include one or more of porosity, acoustic impedance, density, lithology, and/or other parameters. Parameter values may include data specifying at least one portion of a corresponding parameter.

In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction modules. The instruction modules may include computer program modules. The instruction modules may include one or more of a training data obtaining module 108, a mapping model obtaining module 112, a mapping model generating module 114, a mapping model storing module 116, a target obtaining module 110, a mapping model applying module 118, a set selection module 120, an image generating module 122, an image display module 124, and/or other instruction modules.

Training data obtaining module 108 may be configured to obtain, from the electronic storage, training data, the training data including (i) unrefined subsurface map data sets specifying estimated parameter values of a first parameter as a function of position within corresponding subsurface volumes of interest, and (ii) refined subsurface map data sets specifying refined estimations of parameter values of the first parameter as a function of position within the corresponding subsurface volumes of interest. Training data may include synthetic data. Synthetic data may include subsurface map data with known corresponding refined subsurface map data, and/or other data. In some implementations, synthetic data may be obtained through computational stratigraphy modeling and/or other synthetic seismic forward models.

In some implementations, training data may include one or more synthetic data pairs: subsurface map data specifying parameter values with noise introduced at several stages of the imaging process and noise-free parameter values, subsurface map data specifying parameter values that are filtered to have a lower sampling density and corresponding parameter values that have a higher sampling density than the filtered parameter values, subsurface map data specifying parameter values and corresponding indications of signal-to-noise ratio quality, and/or other data pairs. In some implementations, an individual subsurface map data within a pair may be a different type of data from a corresponding individual subsurface map data within a pair. For example, a first subsurface map data within a pair may be a seismic image with a low sampling density while the corresponding second subsurface map data within the pair may be a seismic map with a high sampling density.

Unrefined subsurface map data sets may include subsurface map data that has not been processed by the initial seismic mapping model or the conditioned seismic mapping model. In some implementations, unrefined subsurface map data sets may include parameter values that have had noise introduced at several stages of the imaging process. For example, ground roll, surface waves, velocity errors, multiples, migration artifacts, processing noise, and/or other noise may be introduced. In some implementations, parameter values may be filtered to have a lower sampling density. For example, a seismic image may be filtered to have lower resolution. In some implementations, subsurface map data may specify parameter values that may qualitatively indicate a signal-to-noise quality.

Refined subsurface map data sets may include subsurface map data that has been processed by the initial seismic mapping model or the conditioned seismic mapping model. In some implementations, refined subsurface map data sets may include parameter values that have been denoised with respect to the parameter values corresponding to the unrefined subsurface map data. In some implementations, refined subsurface map data sets may include parameter values that have a higher sampling density than the parameter values corresponding to the unrefined subsurface map data. In some implementations, refined subsurface map data may include an indication of signal-to-noise ratio quality with respect to the parameter values corresponding to the unrefined subsurface map data.

Target obtaining module 110 may be configured to obtain one or more initial target subsurface map data sets. The one or more initial target subsurface map data sets may include actual subsurface map data from a volume of interest. In some implementations, the one or more initial target subsurface map data sets may have been derived from different seismic pre-stack data sets. In some implementations, the one or more initial target subsurface map data sets may include subsurface map data. In some implementations, the one or more initial target subsurface map data sets may include data that has not been processed by an initial seismic mapping model or a conditioned seismic mapping model.

Mapping model obtaining module 112 may be configured to obtain, from the electronic storage, an initial seismic mapping model. An initial seismic mapping model may include a deep neural network, such as a convolutional neural network and/or a generative adversarial network, and/or other machine learning systems.

Mapping model generating module 114 may be configured to generate a conditioned seismic mapping model by training, on the one or more physical computer processors using the training data, the initial seismic mapping model. A conditioned seismic mapping model may include a deep neural network, such as a convolutional neural network and/or a generative adversarial network, and/or other machine learning systems.

Mapping model storing module 116 may be configured to store the conditioned seismic mapping model in the electronic storage.

Mapping model applying module 118 may be configured to apply the conditioned seismic mapping model to the initial target subsurface map data set to generate a refined target subsurface map data set. A refined target subsurface map data set may include subsurface map data that may have been processed by the initial seismic mapping model or the conditioned seismic mapping model. In some implementations, a refined target subsurface map data set may include parameter values that have been denoised with respect to parameter values in the initial target subsurface map data set. In some implementations, a refined target subsurface map data set may include parameter values with a higher sampling density than the unrefined target subsurface map data set.

In some implementations, mapping model applying module 118 may be configured to apply the conditioned seismic mapping model individually to the initial target subsurface map data sets to generate metric values of an estimated quality metric for the individual initial target subsurface map data sets. The estimated quality metric may include an indication of signal-to-noise ratio quality.

Set selection module 120 may be configured to select from among the multiple sets of seismic pre-stack data based on the metric values of the estimated quality metric determined for the initial target subsurface map data sets derived from the seismic pre-stack data sets. In some implementations, the selected seismic pre-stack data sets may be determined by whether a metric value corresponding to seismic pre-stack data exceeds a threshold value.

Image generating module 122 may be configured to generate an image that represents the refined target subsurface map data set using visual effects to depict at least a portion of the parameter values in the refined target subsurface map data set as a function of position within the subsurface volume of interest. In some implementations, the image may include a map of the subsurface volume of interest.

Visual effects may refer to a change in presentation of the image on a display. In some implementations, visual effects may include one or more visual transformations of the image.

Image generating module 122 may be configured to generate a stacked seismic image using selected ones of the seismic pre-stack data sets. In some implementations, a stacked seismic image may include processed subsurface map data that have been selected from different data sets. In some implementations, the data may be superimposed. In some implementations, pre-stack data sets may include subsurface map data and/or other data that have not yet been processed together.

Image display module 124 may be configured to display, on a graphical user interface, the image. The graphical user interface may include a user interface based on graphics instead of text; it may include a mouse as well as a keyboard as an input device, according to some implementations. Image display module 124 may be configured to display, on a graphical user interface, the stacked seismic image.

In some implementations, server(s) 102, client computing platform(s) 104, and/or external resources 126 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 126 may be operatively linked via some other communication media.

A given client computing platform 104 may include one or more physical computer processors configured to execute computer program modules. The computer program modules may be configured to enable an expert or user associated with the given client computing platform 104 to interface with system 100 and/or external resources 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 126 may include sources of information outside of system 100, external entities participating with system 100, and/or other resources. In some implementations, some or all of the functionality attributed herein to external resources 126 may be provided by resources included in system 100.

Server(s) 102 may include electronic storage 128, one or more physical computer processors 130, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute modules 108, 110, 112, 114, 116, 118, 120, 122, 124, and/or other modules. Processor(s) 130 may be configured to execute modules 108, 110, 112, 114, 116, 118, 120, 122, 124, and/or other modules by software; hardware; firmware; some combination of software, hardware, and/or firmware; and/or other mechanisms for configuring processing capabilities on processor(s) 130. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, 114, 116, 118, 120, 122, and 124 are illustrated in FIG. 1 as being implemented within a single processing unit, in implementations in which processor(s) 130 includes multiple processing units, one or more of modules 108, 110, 112, 114, 116, 118, 120, 122, and/or 124 may be implemented remotely from the other modules. The description of the functionality provided by the different modules 108, 110, 112, 114, 116, 118, 120, 122, and/or 124 described below is for illustrative purposes, and is not intended to be limiting, as any of modules 108, 110, 112, 114, 116, 118, 120, 122, and/or 124 may provide more or less functionality than is described. For example, one or more of modules 108, 110, 112, 114, 116, 118, 120, 122, and/or 124 may be eliminated, and some or all of its functionality may be provided by other ones of modules 108, 110, 112, 114, 116, 118, 120, 122, and/or 124. As another example, processor(s) 130 may be configured to execute one or more additional modules that may perform some or all of the functionality attributed below to one of modules 108, 110, 112, 114, 116, 118, 120, 122, and/or 124.

Figure 2:
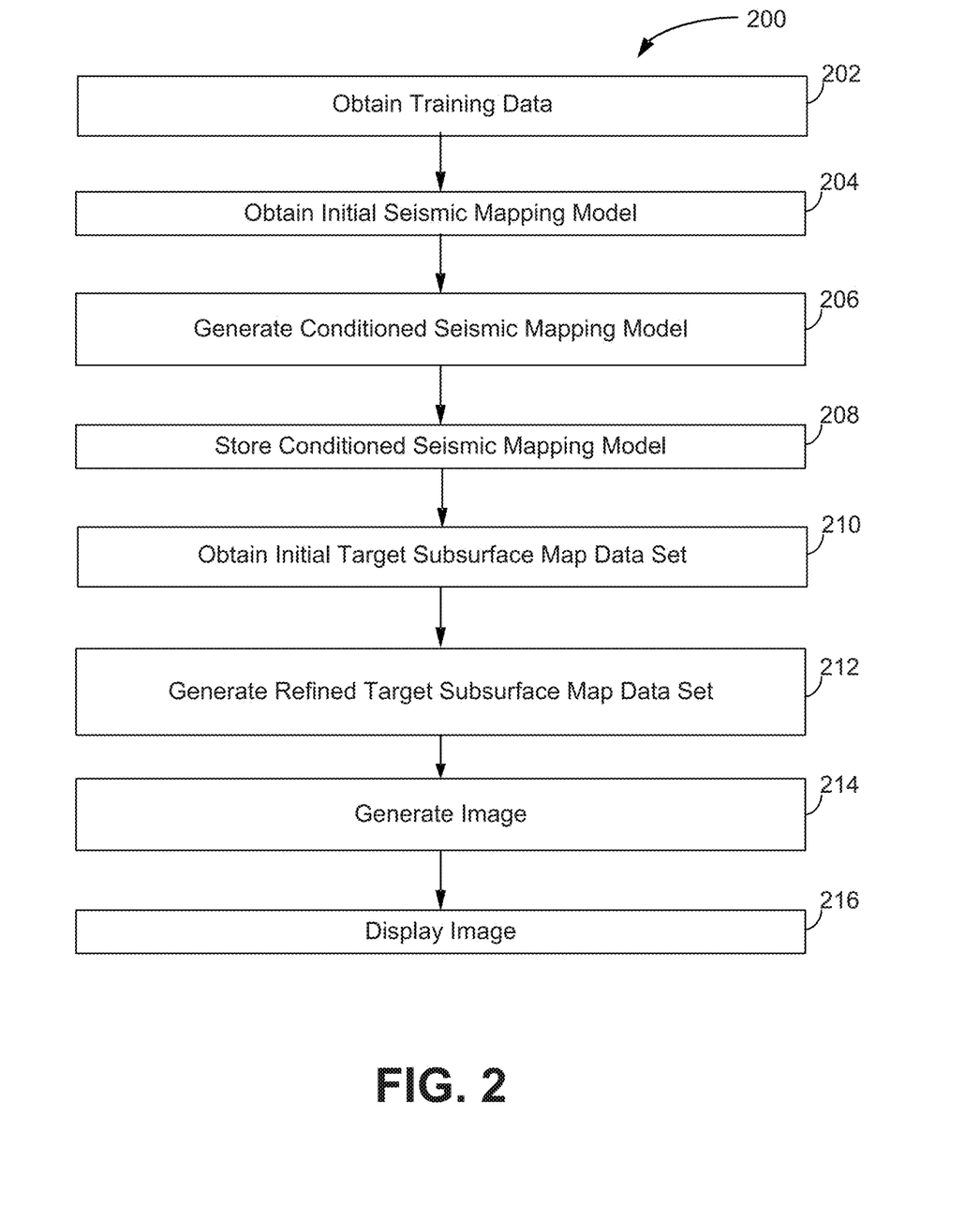
FIG. 2 illustrates a method for training a model that refines estimated parameter values within subsurface map data sets, in accordance with one or more implementations.

FIG. 2 illustrates a method 200 for training a model that refines estimated parameter values within subsurface map data sets, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, a physical computer processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include obtaining training data. In some implementations, the training data may be obtained from electronic storage. In some implementations, the training data may include (i) unrefined subsurface map data sets specifying estimated parameter values of a first parameter as a function of position within corresponding subsurface volumes of interest and (ii) refined subsurface map data sets specifying refined estimations of parameter values of the first parameter as a function of position within the corresponding subsurface volumes of interest. In some implementations, the training data may include synthetic data pairs: subsurface map data specifying parameter values with noise introduced at several stages of the imaging process and noise-free parameter values, subsurface map data specifying parameter values that are filtered to have a lower sampling density and corresponding parameter values that have a higher sampling density than the filtered parameter values, and/or other data pairs.

In some implementations, unrefined subsurface map data sets may include parameter values that have had noise introduced at several stages of the imaging process, parameter values that are filtered to have a lower sampling density, and/or other data. In some implementations, refined subsurface map data sets may include parameter values that have been denoised with respect to the parameter values corresponding to the unrefined subsurface map data, parameter values that have a higher sampling density than the parameter values corresponding to the unrefined subsurface map data, and/or other data. Operation 202 may be performed by one or more physical computer processors configured by machine-readable instructions including a module that is the same as or similar to training data obtaining module 108, in accordance with one or more implementations.

An operation 204 may include obtaining an initial seismic mapping model. In some implementations, the initial seismic mapping model may be obtained from electronic storage. In some implementations, the initial seismic mapping model may include one or more of a convolutional neural network, a generative adversarial network and/or other machine learning systems. Operation 204 may be performed by one or more physical computer processors configured by machine-readable instructions including a module that is the same as or similar to mapping model obtaining module 112, in accordance with one or more implementations.

An operation 206 may include generating a conditioned seismic mapping model. In some implementations, the conditioned seismic mapping model may be generated by training the initial seismic mapping model. In some implementations, the conditioned seismic mapping model may be generated by one or more physical computer processors using the training data. In some implementations, the conditioned seismic mapping model may include one or more of a convolutional neural network, a generative adversarial network, and/or other machine learning systems. Operation 206 may be performed by one or more physical computer processors configured by machine-readable instructions including a module that is the same as or similar to mapping model generating module 114, in accordance with one or more implementations.

An operation 208 may include storing the conditioned seismic mapping model. In some implementations, the conditioned seismic mapping model may be stored in electronic storage. Operation 208 may be performed by one or more physical computer processors configured by machine-readable instructions including a module that is the same as or similar to mapping model storing module 116, in accordance with one or more implementations.

An operation 210 may include obtaining an initial target subsurface map data set. In some implementations, the initial target subsurface map data set may include actual seismic data, AVA data, AVO data, seismic pre-stack data, seismic images, three-dimensional seismic maps, reservoir models, migrated data, stacked images, parameter values, and/or other data. Operation 210 may be performed by one or more physical computer processors configured by machine-readable instructions including a module that is the same as or similar to target obtaining module 110, in accordance with one or more implementations.

An operation 212 may include generating a refined target subsurface map data set. In some implementations, the conditioned seismic mapping model may be applied to the initial target subsurface map data set to generate the refined target subsurface map data set. In some implementations, the refined target subsurface map data set may include the data from an initial target subsurface map data set that has been processed by the conditioned seismic mapping model. In some implementations, the refined target subsurface map data set may include subsurface map data specifying noise-free parameter values, subsurface map data specifying parameter values that have a higher sampling density with respect to parameter values in the initial target subsurface map data set, and/or other data. Operation 212 may be performed by one or more physical computer processors configured by machine-readable instructions including a module that is the same as or similar to mapping model applying module 118, in accordance with one or more implementations.

An operation 214 may include generating an image. In some implementations, the image may represent the refined target subsurface map data set using visual effects. Operation 214 may be performed by one or more physical computer processors configured by machine-readable instructions including a module that is the same as or similar to image generating module 122, in accordance with one or more implementations.

An operation 216 may include displaying the image. In some implementations, the image may be displayed on a graphical user interface. Operation 216 may be performed by one or more physical computer processors configured by machine-readable instructions including a module that is the same as or similar to image display module 124, in accordance with one or more implementations.

Figure 3:
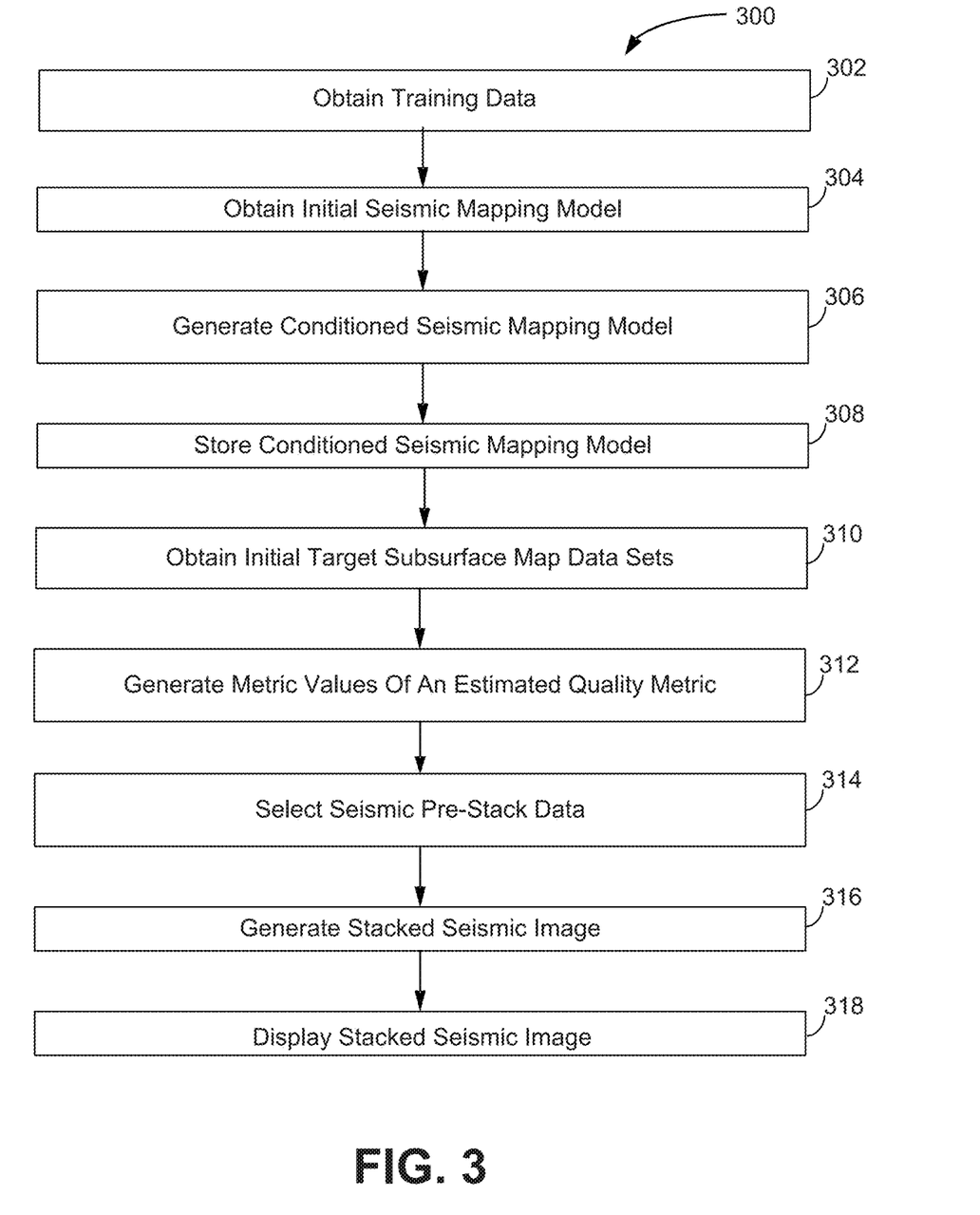
FIG. 3 illustrates a method for training a model that refines estimated parameter values within subsurface map data sets, in accordance with one or more implementations.

FIG. 3 illustrates a method 300 for training a model that refines estimated parameter values within subsurface map data sets, in accordance with one or more implementations. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in one or more processing devices (e.g., a digital processor, a physical computer processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

An operation 302 may include obtaining training data. In some implementations, the training data may be obtained from electronic storage. In some implementations, the training data may include (i) unrefined subsurface map data sets specifying estimated parameter values of a first parameter as a function of position within corresponding subsurface volumes of interest and (ii) refined subsurface map data sets specifying refined estimations of parameter values of the first parameter as a function of position within the corresponding subsurface volumes of interest. In some implementations, the training data may include synthetic data pairs: subsurface map data specifying parameter values and corresponding indications of signal-to-noise ratio quality, and/or other data pairs.

In some implementations, the unrefined subsurface map data sets may include subsurface map data and/or other data. In some implementations, the refined subsurface map data sets may include an indication of signal-to-noise ratio quality with respect to the parameter values corresponding to the unrefined subsurface map data and/or other data. Operation 302 may be performed by one or more physical computer processors configured by machine-readable instructions including a module that is the same as or similar to training data obtaining module 108, in accordance with one or more implementations.

An operation 304 may include obtaining an initial seismic mapping model. In some implementations, the initial seismic mapping model may be obtained from electronic storage. In some implementations, the initial seismic mapping model may include one or more of a convolutional neural network and/or other machine learning systems. Operation 304 may be performed by one or more physical computer processors configured by machine-readable instructions including a module that is the same as or similar to mapping model obtaining module 112, in accordance with one or more implementations.

An operation 306 may include generating a conditioned seismic mapping model. In some implementations, the conditioned seismic mapping model may be generated by training the initial seismic mapping model. In some implementations, the conditioned seismic mapping model may be generated by one or more physical computer processors using the training data. In some implementations, the conditioned seismic mapping model may include one or more of a convolutional neural network and/or other machine learning systems. Operation 306 may be performed by one or more physical computer processors configured by machine-readable instructions including a module that is the same as or similar to mapping model generating module 114, in accordance with one or more implementations.

An operation 308 may include storing the conditioned seismic mapping model. In some implementations, the conditioned seismic mapping model may be stored in electronic storage. Operation 308 may be performed by one or more physical computer processors configured by machine-readable instructions including a module that is the same as or similar to mapping model storing module 116, in accordance with one or more implementations.

An operation 310 may include obtaining initial target subsurface map data sets. In some implementations, the initial target subsurface map data set may have been derived from seismic pre-stack data and/or other data. Operation 310 may be performed by one or more physical computer processors configured by machine-readable instructions including a module that is the same as or similar to target obtaining module 110, in accordance with one or more implementations.

An operation 312 may include generating metric values of an estimated quality metric. In some implementations, the metric values may be generated by applying the conditioned seismic mapping model individually to the initial target subsurface map data sets. In some implementations, the estimated quality metric may include indications of signal-to-noise ratio quality. Operation 312 may be performed by one or more physical computer processors configured by machine-readable instructions including a module that is the same as or similar to mapping model applying module 118, in accordance with one or more implementations.

An operation 314 may include selecting seismic pre-stack data. In some implementations, the seismic pre-stack data may be selected from among multiple sets of pre-stack data based on the metric values of the estimated quality metric. In some implementations, the selected seismic pre-stack data sets may be determined by whether a metric value corresponding to seismic pre-stack data exceeds a threshold value. Operation 314 may be performed by one or more physical computer processors configured by machine-readable instructions including a module that is the same as or similar to set selection module 120, in accordance with one or more implementations.

An operation 316 may include generating a stacked seismic image. In some implementations, the stacked seismic image may be generated by using selected seismic pre-stack data sets. Operation 316 may be performed by one or more physical computer processors configured by machine-readable instructions including a module that is the same as or similar to image generating module 122, in accordance with one or more implementations.

An operation 318 may include displaying the stacked seismic image. In some implementations, the stacked seismic image may be displayed on a graphical user interface. Operation 318 may be performed by one or more physical computer processors configured by machine-readable instructions including a module that is the same as or similar to image display module 124, in accordance with one or more implementations.

Figure 4:
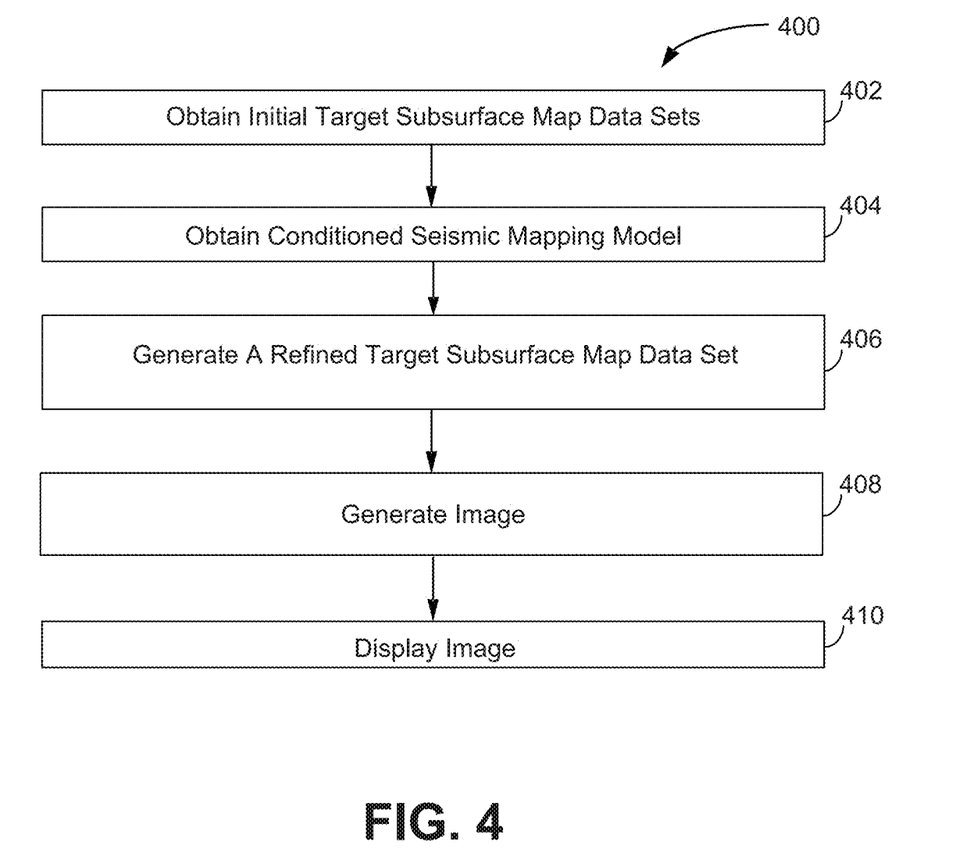
FIG. 4 illustrates a method for refining estimated parameter values within subsurface map data sets, in accordance with one or more implementations.

FIG. 4 illustrates a method 400 for refining estimated parameter values within subsurface map data sets, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

An operation 402 may include obtaining initial target subsurface map data sets. In some implementations, the initial target subsurface map data set may include actual seismic data, AVA data, AVO data, seismic pre-stack data, seismic images, three-dimensional seismic maps, reservoir models, migrated data, stacked images, parameter values, and/or other data. Operation 402 may be performed by one or more physical computer processors configured by machine-readable instructions including a module that is the same as or similar to target obtaining module 110, in accordance with one or more implementations.

An operation 404 may include obtaining a conditioned seismic mapping model. In some implementations, the conditioned seismic mapping model may include one or more of a convolutional neural network, a generative adversarial network, and/or other machine learning systems. Operation 404 may be performed by one or more physical computer processors configured by machine-readable instructions including a module that is the same as or similar to mapping model obtaining module 112, in accordance with one or more implementations.

An operation 406 may include generating a refined target subsurface map data set. In some implementations, the conditioned seismic mapping model may be applied to the initial target subsurface map data set to generate the refined target subsurface map data set. In some implementations, the refined target subsurface map data set may include subsurface map data specifying noise-free parameter values, subsurface map data specifying parameter values that have a higher sampling density with respect to parameter values in the initial target subsurface map data set, and/or other data. Operation 406 may be performed by one or more physical computer processors configured by machine-readable instructions including a module that is the same as or similar to mapping model applying module 118, in accordance with one or more implementations.

An operation 408 may include generating an image. In some implementations, the image may represent the refined target subsurface map data set using visual effects. Operation 408 may be performed by one or more physical computer processors configured by machine-readable instructions including a module that is the same as or similar to image generating module 122, in accordance with one or more implementations.

An operation 410 may include displaying the image. In some implementations, the image may be displayed on a graphical user interface. Operation 408 may be performed by one or more physical computer processors configured by machine-readable instructions including a module that is the same as or similar to image display module 124, in accordance with one or more implementations.

Figure 5:
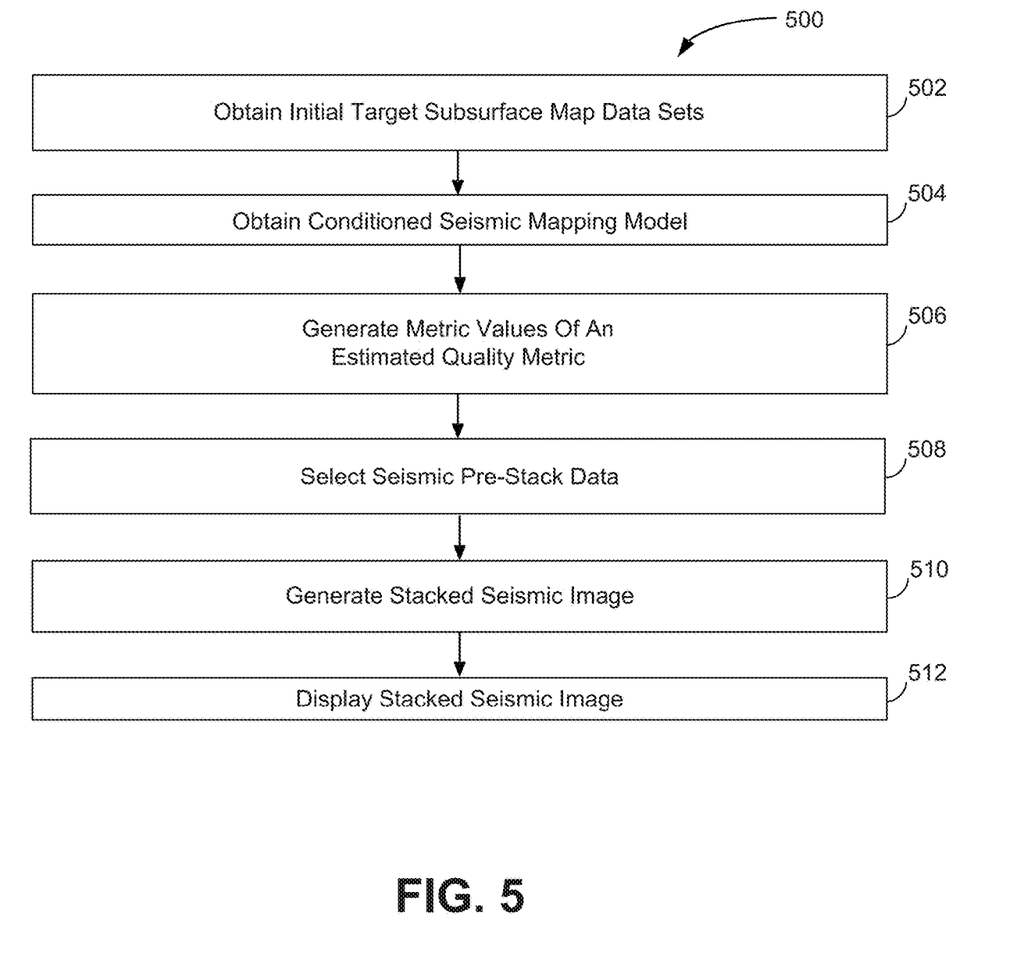
FIG. 5 illustrates a method for refining estimated parameter values within subsurface map data sets, in accordance with one or more implementations.

FIG. 5 illustrates a method 500 for refining estimated parameter values within subsurface map data sets, in accordance with one or more implementations. The operations of method 500 presented below are intended to be illustrative. In some implementations, method 500 may be accomplished with one or more additional operations not described, and/or without one or more of the operations discussed. Additionally, the order in which the operations of method 500 are illustrated in FIG. 5 and described below is not intended to be limiting.

In some implementations, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

An operation 502 may include obtaining initial target subsurface map data sets. In some implementations, the initial target subsurface map data set may have been derived from seismic pre-stack data and/or other data. Operation 502 may be performed by one or more physical computer processors configured by machine-readable instructions including a module that is the same as or similar to target obtaining module 110, in accordance with one or more implementations.

An operation 504 may include obtaining a conditioned seismic mapping model. In some implementations, the conditioned seismic mapping model may include one or more of a convolutional neural network and/or other machine learning systems. Operation 504 may be performed by one or more physical computer processors configured by machine-readable instructions including a module that is the same as or similar to mapping model obtaining module 112, in accordance with one or more implementations.

An operation 506 may include generating metric values of an estimated quality metric. In some implementations, the metric values may be generated by applying the conditioned seismic mapping model individually to the initial target subsurface map data sets. In some implementations, the estimated quality metric may include indications of signal-to-noise ratio quality. Operation 506 may be performed by one or more physical computer processors configured by machine-readable instructions including a module that is the same as or similar to mapping model applying module 118, in accordance with one or more implementations.

An operation 508 may include selecting seismic pre-stack data. In some implementations, the seismic pre-stack data may be selected from among multiple sets of pre-stack data based on the metric values of the estimated quality metric. In some implementations, the selected seismic pre-stack data sets may be determined by whether a metric value corresponding to seismic pre-stack data exceeds a threshold value. Operation 506 may be performed by one or more physical computer processors configured by machine-readable instructions including a module that is the same as or similar to set selection module 120, in accordance with one or more implementations.

An operation 510 may include generating a stacked seismic image. In some implementations, the stacked seismic image may be generated by using selected seismic pre-stack data sets. Operation 508 may be performed by one or more physical computer processors configured by machine-readable instructions including a module that is the same as or similar to image generating module 122, in accordance with one or more implementations.

An operation 512 may include displaying the image. In some implementations, the image may be displayed on a graphical user interface. Operation 508 may be performed by one or more physical computer processors configured by machine-readable instructions including a module that is the same as or similar to image display module 124, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A computer-implemented method for training a model that refines estimated parameter values within subsurface map data sets, the method being implemented in a computer system, the computer system including one or more physical computer processors and non-transitory electronic storage that stores subsurface map data sets that correspond to different subsurface volumes of interest, wherein a given subsurface map data set corresponding to a given subsurface volume of interest specifies estimated parameter values of different parameters as a function of position within the given subsurface volume of interest, the method comprising:

obtaining, from the electronic storage, training data, the training data including (i) unrefined subsurface map data sets specifying estimated parameter values of a first parameter as a function of position within corresponding subsurface volumes of interest, and (ii) refined subsurface map data sets specifying refined estimations of parameter values of the first parameter as a function of position within the corresponding subsurface volumes of interest, wherein the estimated parameter values and the refined estimations of parameter values corresponding to the first parameter are seismic amplitude values, porosity values, acoustic impedance values, density values, or lithology values, and wherein the estimated parameter values include pre-processed noise derived from collecting the parameter values and processed noise derived from processing the estimated parameter values;

obtaining, from the electronic storage, an initial seismic mapping model;

generating a conditioned seismic mapping model by training, on the one or more physical computer processors using the training data, the initial seismic mapping model; and storing the conditioned seismic mapping model in the electronic storage.

2. The computer-implemented method of claim 1, further comprising:

obtaining an initial target subsurface map data set;

applying the conditioned seismic mapping model to the initial target subsurface map data set to generate a refined target subsurface map data set;

generating an image that represents the refined target subsurface map data set using visual effects to depict at least a portion of the parameter values in the refined target subsurface map data set as a function of position within the subsurface volume of interest; and displaying, on a graphical user interface, the image.

3. The computer-implemented method of claim 2, wherein sampling density of parameter values within the subsurface volume of interest is higher for the refined target subsurface map data set than the initial target subsurface map data set.

4. The computer-implemented method of claim 2, wherein the parameter values in the refined target subsurface map data set have been denoised with respect to parameter values in the initial target subsurface map data set.

5. The computer-implemented method of claim 2, wherein the initial target subsurface map data set comprises seismic signals obtained by seismic sensors.

6. The computer-implemented method of claim 1, further comprising:

obtaining multiple initial target subsurface map data sets that have been derived from different seismic pre-stack data sets;

applying the conditioned seismic mapping model individually to the initial target subsurface map data sets to generate metric values of an estimated quality metric for the individual initial target subsurface map data sets;

selecting from among the multiple sets of seismic pre-stack data based on the metric values of the estimated quality metric determined for the initial target subsurface map data sets derived from the seismic pre-stack data sets;

generating a stacked seismic image using selected ones of the seismic pre-stack data sets; and displaying, on a graphical user interface, the stacked seismic image.

7. The computer-implemented method of claim 6, wherein the estimated quality metric comprises an indication of signal-to-noise ratio quality.

8. The computer-implemented method of claim 1, wherein the training data comprise synthetic data.

9. The computer-implemented method of claim 1, wherein the initial seismic mapping model and the conditioned seismic mapping model comprise a convolutional neural network.

10. A computer-implemented method for refining estimated parameter values within subsurface map data sets, the method being implemented in a computer system, the computer system including one or more physical computer processors and non-transitory electronic storage that stores subsurface map data sets that correspond to different subsurface volumes of interest, wherein a given subsurface map data set corresponding to a given subsurface volume of interest specifies estimated parameter values of different parameters as a function of position within the given subsurface volume of interest, the method comprising:

obtaining an initial target subsurface map data set;

obtaining, from the electronic storage, a conditioned seismic mapping model, the conditioned seismic mapping model having been conditioned by training an initial seismic mapping model, wherein the training data includes (i) unrefined subsurface map data sets specifying estimated parameter values of a first parameter as a function of position within corresponding subsurface volumes of interest, and (ii) refined subsurface map data sets specifying refined estimations of parameter values of the first parameter as a function of position within the corresponding subsurface volumes of interest, wherein the estimated parameter values and the refined estimations of parameter values corresponding to the first parameter are seismic amplitude values, porosity values, acoustic impedance values, density values, or lithology values, and wherein the estimated parameter values include pre-processed noise derived from collecting the parameter values and processed noise derived from processing the estimated parameter values;

applying the conditioned seismic mapping model to the initial target subsurface map data set to generate a refined target subsurface map data set;

generating an image that represents the refined target subsurface map data set using visual effects to depict at least a portion of the parameter values in the refined target subsurface map data set as a function of position within the subsurface volume of interest; and displaying, on a graphical user interface, the image.

11. The computer-implemented method of claim 10, wherein sampling density of parameters values within the subsurface volume of interest is higher for the refined target subsurface map data than the initial target subsurface map data.

12. The computer-implemented method of claim 10, wherein the parameter values in the refined target subsurface map data have been denoised with respect to parameter values in the initial target subsurface map data.

13. The computer-implemented method of claim 10, wherein the training data comprise synthetic data.

14. The computer-implemented method of claim 10, wherein the initial target subsurface map data set comprises seismic signals obtained by seismic sensors.

15. The computer-implemented method of claim 10, wherein the initial seismic mapping model and the conditioned seismic mapping model comprise a convolutional neural network.

16. A computer-implemented method for refining estimated parameter values within subsurface map data sets, the method being implemented in a computer system, the computer system including one or more physical computer processors and non-transitory electronic storage that stores subsurface map data sets that correspond to different subsurface volumes of interest, wherein a given subsurface map data set corresponding to a given subsurface volume of interest specifies estimated parameter values of different parameters as a function of position within the given subsurface volume of interest, the method comprising:

obtaining multiple initial target subsurface map data sets that have been derived from different seismic pre-stack data sets;

obtaining, from the electronic storage, a conditioned seismic mapping model, the conditioned seismic mapping model having been conditioned by training an initial seismic mapping model, wherein the training data includes (i) unrefined subsurface map data sets specifying estimated parameter values of a first parameter as a function of position within corresponding subsurface volumes of interest, and (ii) refined subsurface map data sets specifying refined estimations of parameter values of the first parameter as a function of position within the corresponding subsurface volumes of interest, wherein the estimated parameter values and the refined estimations of parameter values corresponding to the first parameter are seismic amplitude values, porosity values, acoustic impedance values, density values, or lithology values, and wherein the estimated parameter values include pre-processed noise derived from collecting the parameter values and processed noise derived from processing the estimated parameter values;

applying the conditioned seismic mapping model individually to the initial target subsurface map data sets to generate metric values of an estimated quality metric for the individual initial target subsurface map data sets;

selecting from among the multiple sets of seismic pre-stack data based on the metric values of the estimated quality metric determined for the initial target subsurface map data sets derived from the seismic pre-stack data sets;

generating a stacked seismic image using selected ones of the seismic pre-stack data sets; and displaying, on a graphical user interface, the stacked seismic image.

17. The computer-implemented method of claim 16, wherein the estimated quality metric comprises an indication of signal-to-noise ratio quality.

18. The computer-implemented method of claim 16, wherein the training data comprise synthetic data.

19. The computer-implemented method of claim 16, wherein the initial target subsurface map data set comprises seismic signals obtained by seismic sensors.

20. The computer-implemented method of claim 16, wherein the initial seismic mapping model and the conditioned seismic mapping model comprise a convolutional neural network.

\* \* \* \* \*